Figure 1:
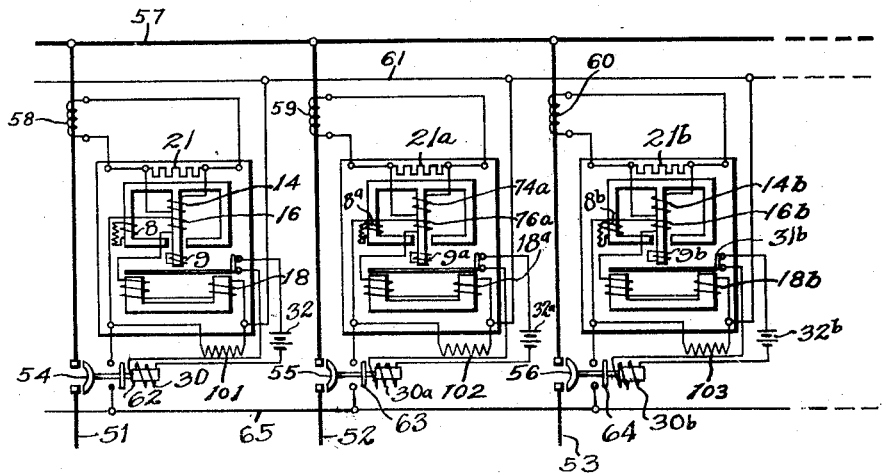

Dec. 1, 1931. H. G. BELL ET AL 1,834,373
PROTECTIVE RELAY FOR ALTERNATING CURRENT SYSTEMS
Filed Nov. 30, 1928  2 Sheets-Sheet 1

INVENTORS
Hugh G. Bell &
Thomas W. Ross
BY
Wesley G. Carr
ATTORNEY

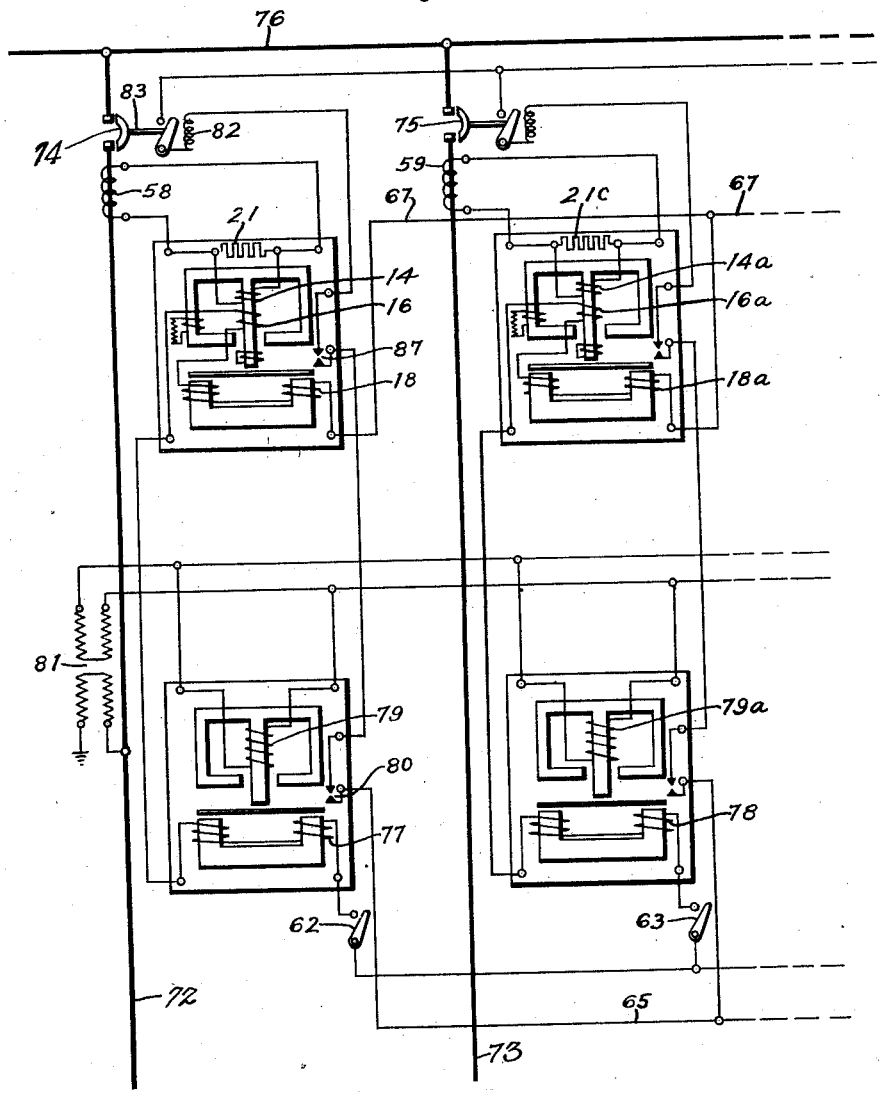

Patented Dec. 1, 1931

1,834,373

UNITED STATES PATENT OFFICE

HUGH GLOVER BELL AND THOMAS WYLIE ROSS, OF SALE, ENGLAND, ASSIGNORS TO WESTINGHOUSE ELECTRIC AND MANUFACTURING COMPANY, A CORPORATION OF PENNSYLVANIA

PROTECTIVE RELAY FOR ALTERNATING CURRENT SYSTEMS

Application filed November 30, 1928, Serial No. 322,904, and in Great Britain December 7, 1927.

This invention relates to protective gear for parallel feeders in electrical alternating current systems. In protective gear for parallel feeders of the kind with which the invention is concerned, the currents in the several active feeders are compared and if during operation the current in any one active feeder is materially different from that in other feeders, a protective relay, associated with that feeder, is energized to cause the disconnection thereof.

It has heretofore been the practice in parallel feeder protection, of the kind set forth, when no long pilot conductors are employed, to associate current transformers severally with the several parallel feeders, and to connect the secondary windings thereof to form a closed circulating current circuit. The protective relays were then connected respectively across the several secondary windings of the current transformers. In such a case, as long as the currents in the several secondary windings are all equal, no current flows through any of the relays. If on the other hand, the current induced in the secondary of any one of the current transformers is different from that induced in the secondaries of other transformers, the difference flows through the relay associated with that current transformer and energizes the relay to cause the disconnection of the faulty feeder. This type of protective arrangement may be referred to as the "circulating current" system of protection.

In the protection of independent long cables or feeders, transformers or the like, protection has been achieved by comparison of the currents at the incoming end and outgoing end. This has been effected by the circulating current system of protection in a manner analogous to that above described, and also by what may be termed the "balanced voltage" system of protection.

In the balanced voltage system of protection, electromotive forces are produced, by series transformers which are so designed that the flux in the core is directly proportional to the primary current, and applied in opposition to one another in a circuit to which is connected one or more relays. The relays are only energized when there is a difference between the electromotive forces consequent upon a difference between the primary currents of the series transformers. The use of series transformers in which the magnetic flux in the core is proportional to the primary current throughout the operating range is accompanied by certain disadvantages. Balanced voltage protection has, therefore, so far as the applicants are aware, only been used in cases where long pilot wires are necessary to join the points, the currents at which are to be compared, when the saving in cost of pilot conductors offsets the disadvantages of using series transformers in which the magnetic flux in the core is at all times proportional to the primary current.

According to the present invention, a protective system for parallel feeders employing the balanced voltage system of protection is provided. This may be effected by associating with the several parallel feeders the primaries of series transformers of the type in which the flux in the core is directly proportional the primary current, and connecting the secondary circuits, each in series with the operating coil of a protective relay, in opposition to one another. By the employment of the balanced voltage system of protection for parallel feeders certain advantages, which will hereinafter appear, may be secured.

In order to obviate the disadvantages associated with series transformers of the usual pattern having open cores and connected directly in series with the feeders, it is convenient to use for each feeder, two transformers connected in cascade, one of which has a closed iron core and is such that the secondary current is proportional to the primary current and the second of which has a core having nonmagnetic portions or air gaps and delivers a secondary electromotive force which is proportional to the primary current throughout the operating range. The first of the transformers is connected directly in series with the feeder and the primary of the second is connected directly in series with the secondary of the first.

Preferably directional protective relays are employed, and these are arranged so that when the current in any one feeder exceeds the currents in the other feeders, the relay is energized in such a direction as to tend to cause the disconnection of that feeder, while the relays associated with other feeders are energized in such a direction as to tend to maintain connected the feeders with which they are associated. Preferably induction type relays having field windings energized in proportion to the currents flowing in the feeders are utilized.

If desired, the protective relays, used to cause the disconnection of the feeders when the distribution of total current among the feeders is uneven, may also be utilized to afford overload protection of the feeders as a whole and individually. For this purpose impedances, preferably resistances, may be connected in shunt to the secondary windings of the series transformers and relay operating coils whereby currents proportional to the currents in the feeders are permitted to flow through the relay operating coils in a direction tending to cause disconnection of the feeders. When this current exceeds a predetermined value, the relays will be operated to cause disconnection of the feeders, even though the total current in the feeders may be evenly distributed among the feeders.

In the operation of parallel feeder systems, it is frequently necessary to vary the number of parallel-connected feeders in operation. If any one feeder of a group of parallel feeders is inoperative, it is necessary to dissociate the secondary of the series transformer and the relay associated with that feeder from the remaining secondary circuits, in order that the inoperative series transformer and relay shall not upset the working of the remainder of the protective apparatus. When the balanced voltage system of protection is employed, it is only necessary to effect an interruption in the series circuit of the secondary of the series transformer associated with the inoperative feeder. Such interruption can be effected by relatively small and cheap contacts, since these do not normally have to carry heavy currents, and a small drop of voltage at the contacts is not prejudicial to the operation of the protective apparatus. In the series circuit of the secondary of the series transformer and the relay associated with each feeder, contacts may be disposed which are interlocked with the circuit breaker which controls the feeder so that they are closed only when the circuit breaker is closed. Thus when any one feeder is not in operation and its circuit breaker is open, the protective apparatus associated with that feeder is rendered ineffective, and precluded from disturbing the remaining protective apparatus.

When a parallel connected feeder is brought into service, upon the closure of its circuit breaker, the protective apparatus associated therewith is associated with the protective apparatus of other feeders already in service. It is possible that upon closure of the circuit breaker, no current, or only a small current, will flow through the feeder, (for example if a circuit breaker at the remote end of the feeder is open, or if the current in the feeder takes some time to build up). In such circumstances, it is obvious that the protective apparatus associated with the incoming feeder will cause a disturbance in the protective apparatus of all feeders in service, possibly causing the latter protective apparatus to operate to disconnect all the feeders already in service.

According to the invention, in protective apparatus of the kind in which series transformers with balanced secondary circuits are employed for the protection of parallel feeders, a contactor is arranged to render the relay and series transformer associated with any one feeder ineffective when that feeder is connected to an electrical network, but is not carrying load. When the balanced voltage system of parallel feeder protection hereinbefore described is utilized, the operating coil of this contactor may be arranged in series with the secondary of the series transformer and relay operating coil. The contactor may be operated by a solenoid or coil energized in proportion to the current flowing in the feeder, for example, by a current transformer. If cascaded series transformers are used in the manner above described, the solenoid or coil of the contactor may be connected in series with the secondary winding of the first transformer and primary winding of the second transformer.

For the protection of the incoming end of parallel feeders, that is to the end from which energy is delivered to an energy consuming unit, such as a substation, or to a further distribution network, it is desirable also to provide directional relays to render ineffective the energization of the protective relay, hereinbefore referred to, except when there is both a reversal of direction of power flow in one or more feeders and inequality of current in the several feeders. The directional relays may be induction type relays, and their operating coils may be connected directly in series with those of the protective relays hereinbefore referred to. The potential coils of the directional relays may be excited by means of potential transformers, or directly from the appropriate phases of the several parallel feeders.

Figure 2:
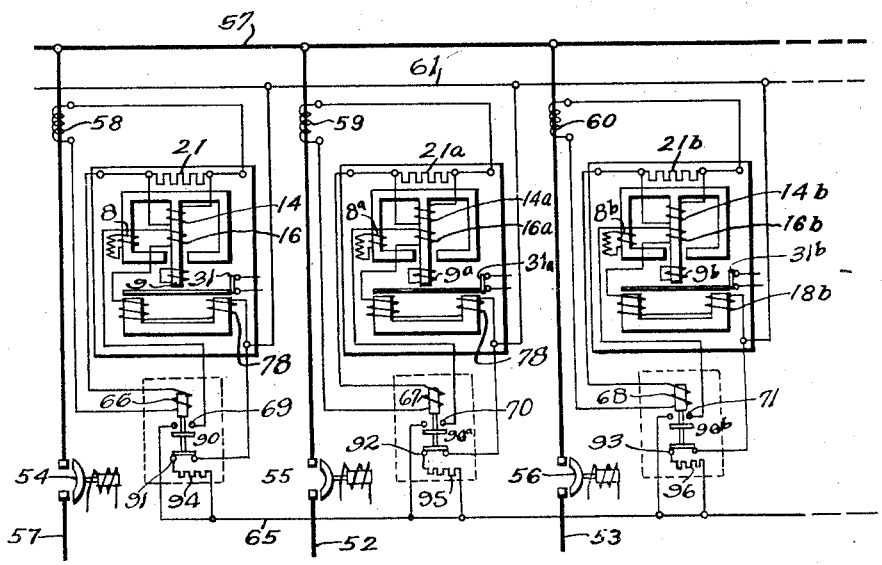

For the better understanding of the invention, it is described with reference to the accompanying drawings, in which Fig. 1 is a diagram representing one manner of carrying out the invention as applied to the outgoing end of parallel feeders;

Fig. 2 is a diagram illustrating a modification of the system illustrated in Fig. 1; and Fig. 3 is a diagram representing one manner of applying the invention to the incoming end of parallel feeders.

Referring now to Fig. 1, a plurality of parallel feeders 51, 52 and 53 are connected through circuit interrupters 54, 55 and 56 respectively to three-phase supply bus-bars 57. Series transformers 58, 59 and 60, preferably having closed iron cores are included in the connections between the circuit interrupters 54, 55, 56 and the bus-bars. The secondary windings of the series transformers are respectively connected to the primary windings 14, 14a and 14b upon the cores of induction type relays associated with the several feeders. The windings 14, 14a and 14b are shunted by non-inductive resistances 21, 21a and 21b. Secondary windings 16, 16a and 16b are similarly mounted upon the cores of the induction type relays and are respectively connected at one end through windings of the operating magnets 18, 18a and 18b to a common pilot wire 61. The other ends of the secondary windings are connected through auxiliary switches 62, 63 and 64 to another common pilot wire 65. The auxiliary switches 62, 63 and 64 are so interlocked with the circuit interrupters 54, 55 and 56 respectively that each auxiliary switch will open whenever its associated circuit interrupter opens.

In the operation of the system, the currents induced in the secondary windings of the current transformers 58, 59 and 60 traverse the windings 14, 14a and 14b. The central limbs of the E-shaped field magnets act as the cores of transformers and electromotive forces are set up in the windings 16, 16a and 16b which are proportional to the currents flowing through the windings 14, 14a and 14b. If the currents in the several feeders are equal in phase and magnitude, the electromotive forces will also be equal and no current will flow through the windings of the operating magnets 18, 18a and 18b. On the other hand, if the current in any one feeder exceeds that of any of the other feeders, a current will flow through the operating coil of the corresponding relay in such a direction as to tend to cause that relay to close its contacts and through the operating coils of the remaining relays in parallel in such a direction as to cause these relays to maintain their contacts open. The relay associated with the faulty feeder is thereby operated to close its contacts which are arranged to trip the circuit interrupter associated with that feeder. If any one feeder, such for example as the feeder 51, is not in operation, the auxiliary switch which is associated with the circuit interrupter controlling the feeder, such for example as the auxiliary switch 62, which is associated with the circuit interrupter 54, is open and thus the circuit of the secondary winding and winding of the operating magnet, such as 16 and 18 of that relay, is open. The relay associated with the inoperative feeder is thus rendered ineffective and disturbance of the remainder of the system by this relay is precluded.

The relays are provided with phase shifting windings as represented by the windings 8, 8a and 8b, and 9, 9a and 9b, respectively. The showing of these windings is merely diagrammatic, since one skilled in the art may provide any suitable damping or phase splitting means.

Trip coils 30, 30a and 30b of the respective circuit interrupters 54, 55 and 56 are adapted to be energized by the closing of the respective relay contacts 31, 31a and 31b. The tripping circuits are shown diagrammatically as being energized by batteries 32, 32a and 32b, respectively, but it is to be understood that the tripping circuits may be energized by any known means such, for example, as mentioned hereinbefore.

In order to provide simultaneous overload protection, resistances 101, 102 and 103 may be respectively connected in shunt to the secondary windings and windings of the operating magnets of the several relays. The value of these resistances is such that the electromotive force set up in the secondary windings of the relays, when an overload current of predetermined magnitude is flowing through the feeders, causes sufficient current to flow through the resistances to cause operation of the relays. It will be seen that the resistances 101, 102 and 103 are respectively disconnected from the pilot wires 61 and 65, by the auxiliary switches 62, 63 and 64, respectively, when their respective feeders and relays are inoperative. Consequently the total overload setting of the system is automatically varied in accordance with the number of feeders in service. Alternatively, a resistance of variable value may be connected between the pilot wires 61 and 65, and its value may be changed in accordance with the number of feeders and relays in service.

If the circuit interrupter and auxiliary switch associated with any one feeder were to be closed so that the secondary circuit of the relay associated therewith were completed and no current were flowing through that feeder, or if on closure of the circuit interrupter the current took some considerable time to build up, current would flow through the operating coils of the relays associated with the other feeders in such a direction as to tend to cause these relays to close their contacts and trip the switches associated with those other feeders. In order to prevent this happening, the arrangement shown in Fig. 2 may be adopted.

This arrangement is broadly similar to that illustrated in Fig. 1, but the operating coils 66, 67 and 68 of the contactors 90, 90a and 90b are connected directly in series with the secondary windings of the current transformers 58, 59 and 60. The contacts 69, 70 and 71 of the contactors are arranged to be closed only when their respective operating coils 66, 67 and 68 are energized. Thus the secondary circuits of the several relays are not connected to the pilot wire 65 unless there is current flowing through the corresponding feeders. When such contactors are used, the auxiliary switches 62, 63 and 64 shown in Fig. 1 may be omitted. Also in order to provide a complete secondary circuit for a relay associated with a solitary feeder carrying load, resistances 94, 90a and 90b may be shunted across the pilot wires 61 and 65, by means of the contacts 91, 92 and 93.

When the invention is applied to the incoming end of parallel feeders, which is the end which is connected to an energy consuming unit, such as a sub-station, it is desirable to provide directional relays to prevent the operation of the relays above described except when there is a reversal as well as inequality of current in the feeders.

The application of the invention to the incoming ends of parallel feeders is shown in Fig. 3. Parallel feeders 72 and 73 are connected through circuit breakers 74 and 75 to bus-bar 76, such as substation bus-bars. Current transformers 58 and 59 are included in the feeders 72 and 73, respectively, and their secondary windings are connected to the windings 14 and 14a of induction type relays as described with reference to Fig. 1.

Additional induction type directional relays having operating windings 77 and 78 and field windings 79 and 79a are provided. The field windings 79 and 79a are energized by means of a potential transformer 81, the primary winding of which is connected to feeder 72 but may be connected to either one of the parallel feeders 72 and 73. The field windings may also be energized in accordance with the source feeder voltage or by separate potential transformers connected to the respective feeders (not shown).

The operating winding 77 is connected in series with the secondary winding 16 and winding of the operating magnet 18. Likewise, the operating winding 78 is connected in series with the secondary winding 16a and winding of the operating magnet 18a.

The contacts 80 of the directional relay associated with the feeder 72 are connected in series with the contacts 81 of the induction type relay, previously described, which is associated with the same feeder and in series with the tripping coil 82 and the auxiliary contacts 83 of the circuit interrupter 74. The contacts of the relays associated with other feeders are similarly connected in the tripping circuits of the circuit interrupters associated with those feeders. The contacts such as 80 of the directional relays are arranged to be closed only when there is reversal of the direction of power flow in the feeder with which the particular relay is associated. Since the contacts 80 and 81 are in series, the circuit interrupter 74 can only be tripped by the energization of the tripping coil 82 when both the relays associated with that feeder are operated to close their contacts. Instead of the contacts 80 being arranged to interrupt the secondary circuits of the relays, they may be arranged to short circuit the operating coil 18 or 18a.

The equipment for one phase only has been described and similar equipment for every phase may be provided or the relays for three phases, for example, may be combined to form a single unit.

Various modifications and changes may be made in our invention without departing from the spirit and scope thereof, and we desire, therefore, that only such limitations shall be placed thereon as are imposed by the prior art and the appended claims.

We claim as our invention:

1. In a parallel-feeder protective system, relays associated with the respective feeders for causing the disconnection thereof selectively upon the occurrence of a fault condition on one of the feeders, said relays including operating windings energized in proportion to the currents traversing the respective feeders and electrically connected in balanced-circuit relation, and means for interrupting the circuit of the operating winding of the relay associated with a faulty feeder in response to the disconnection thereof.

2. In a parallel-feeder protective system, comprising relays associated with the respective feeders, an energizing winding on each relay energized in accordance with the current traversing the associated feeder, an operating winding on each relay energized in accordance with the energization of said first mentioned winding, said operating windings being electrically connected in opposition, whereby the operation of the relays is precluded during balanced load conditions on the feeders.

3. In a parallel-feeder protective system, circuit-interrupting means provided for each feeder, a relay associated with each feeder, each relay having an operating winding energized in accordance with the current traversing the associated feeder and means for electrically connecting said operating windings so that when the current traversing one feeder exceeds that traversing the other feeders, the relay associated with that feeder is energized to effect the operation of the feeder circuit-interrupting means and the other relays are energized in a direction to prevent the operation thereof.

4. In a parallel-feeder protective system, circuit-interrupting means provided for each feeder, relays associated with the feeders for effecting the selective operation of the respective circuit-interrupting means upon the occurrence of a fault on one of said feeders, each of said relays including an operating winding electrically connected in balanced-circuit relation with the operating windings of the other relays, and means operative by the disconnection of a faulty feeder for deenergizing the operating winding of the relay associated therewith and for maintaining the remaining operating winding in balanced-circuit relation.

5. In a parallel-feeder protective system, a relay associated with each feeder, each relay having an operating winding energized in accordance with the current traversing the associated feeder, and means for electrically connecting said operating windings so that upon the occurrence of a fault on one feeder, the relay associated therewith is energized in a direction to effect the disconnection of that feeder and the relays associated with the remaining feeders are energized in a direction to prevent the disconnection of the associated feeders, and means associated with each relay for causing the operation thereof in response to an overload condition on the respective feeder.

6. In a parallel-feeder protective system comprising relays associated with the respective feeders, an energizing winding on each relay energized in accordance with the current traversing the associated feeder, an operating winding on each relay energized in accordance with the energization of said first mentioned winding, said operating windings being electrically connected in opposition in balanced-circuit relation, whereby upon the occurrence of a fault on one of said feeders, the balanced condition of the circuit including said operating winding, is altered to permit the actuation of the relay associated with the faulted feeder, and means associated with each relay for causing the actuation thereof in response to an overload on the respective feeder.

7. In a parallel-feeder protective system comprising relays associated with the respective feeders, an energizing winding on each relay energized in accordance with the current traversing the associated feeder, an operating winding on each relay energized in accordance with the energization of said first mentioned winding, said operating windings being electrically connected in opposition in balanced-circuit relation, whereby upon the occurrence of a fault on one of said feeders, the balanced condition of the circuit including said operating winding, is altered to permit the actuation of the relay associated with the faulty feeder, and means associated with each relay for causing the actuation thereof in response to an overload on the respective feeder, said means comprising an impedance shunting said energizing winding.

8. In a parallel-feeder protective system provided with circuit-interrupting means for the respective feeders, an induction type relay associated with each feeder, having an energizing winding energized in accordance with the feeder current and an operating winding energized in accordance with the energization of said energizing winding, said operating windings being connected in balanced-circuit relation, whereby they are normally ineffective to operate the relays and whereby upon the occurrence of a fault on one of said feeders, the relay associated therewith is operated in a direction to effect the operation of the feeder circuit-interrupting means, and the remaining relays are operated in a direction to preclude the disconnection of the feeders associated therewith.

In testimony whereof, we have hereunto subscribed our names this tenth day of November, 1928.

HUGH GLOVER BELL.
THOMAS WYLIE ROSS.